United States Patent [19]

Howard

[11] 4,244,168
[45] Jan. 13, 1981

[54] BROOM RAKE
[75] Inventor: John R. Howard, West Chicago, Ill.
[73] Assignee: The Drackett Company, Cincinnati, Ohio
[21] Appl. No.: 110,167
[22] Filed: Jan. 7, 1980

Related U.S. Application Data

[63] Continuation of Ser. No. 888,590, Mar. 20, 1978, abandoned.

[51] Int. Cl.³ .......................... A01D 7/06; A01D 7/00
[52] U.S. Cl. ................................ 56/400.17; 15/159 A
[58] Field of Search ........... 56/400.17, 400.18, 400.16; 15/159 A, 186, 187

[56] References Cited

U.S. PATENT DOCUMENTS

| 637,328 | 11/1899 | Franckboner | 15/159 R |
| 1,179,008 | 4/1916 | Ito | 56/400.17 |
| 1,772,571 | 8/1930 | Withington | 56/400.18 |
| 3,038,292 | 6/1962 | Van der Lely et al. | 15/159 A |
| 3,087,223 | 4/1963 | Raw | 15/159 A |
| 3,340,556 | 9/1967 | Allen | 15/159 R |
| 3,829,923 | 8/1974 | Shaw et al. | 15/159 A |

Primary Examiner—Paul J. Hirsch
Attorney, Agent, or Firm—Sharon A. Blinkoff; George A. Mentis

[57] ABSTRACT

An implement for sweeping and raking having a base, a handle attached to the base, and bristles extending out of the base. Each bristle has a first portion, one end of which is engaged in the base, and a similar length, second portion bent at an angle to the first portion. The bent angle between the portions of each bristle is between about 100° and 150°, whereby the implement operates as a broom when it is pushed away from the user and as a rake when it is pulled towards the user.

7 Claims, 2 Drawing Figures

BROOM RAKE

This is a continuation, of application Ser. No. 888,590, filed 3/20/1978 now abandoned.

BACKGROUND OF THE INVENTION

This invention relates to an implement for both sweeping and raking. More particularly it relates to a broom rake useful outdoors for sweeping debris and for raking leaves and grass off a smooth, hard surface, such as a sidewalk, or a discontinuous surface, such as gravel.

It has been known in the past to use a conventional bristle broom for sweeping a sidewalk and a rake for picking up leaves. However, neither of these devices, which are each useful for one of the above mentioned functions, can be effectively used for the other of these functions. The broom rake of this invention provides a single implement for performing both these functions.

U.S. Pat. Nos. 1,942,629 and 2,481,697 disclose devices indentified as "broom rakes", but the devices disclosed therein do not have the same structure as the broom rake of the present invention. Nor do these patents disclose that these devices may be operated as is the broom rake of this invention to perform both sweeping and raking functions. U.S. Pat. No. 3,740,788 discloses a shag rug groomer, which may be raked across a shag rug with a pushing action, a pulling action, or a combination of both actions. While this patent discloses that this groomer penetrates the fibers of a rug to perform its raking function, it does not disclose that it can perform a second function of sweeping a non-penetrable, hard surface or a gravel type surface.

SUMMARY OF THE INVENTION

An implement useful for sweeping and raking. The implement has a base, a handle attached to the base, and bristles extending out of the base. Each bristle has a first portion, one end of which is engaged in the base, and a second portion bent at an angle to the first portion. The bend angle between the portions of each bristle is between about 100° and about 150°, whereby the implement operates as a broom when it is pushed away from the user and as a rake when it is pulled towards the user.

DETAILED DESCRIPTION OF THE INVENTION

Figure 1:
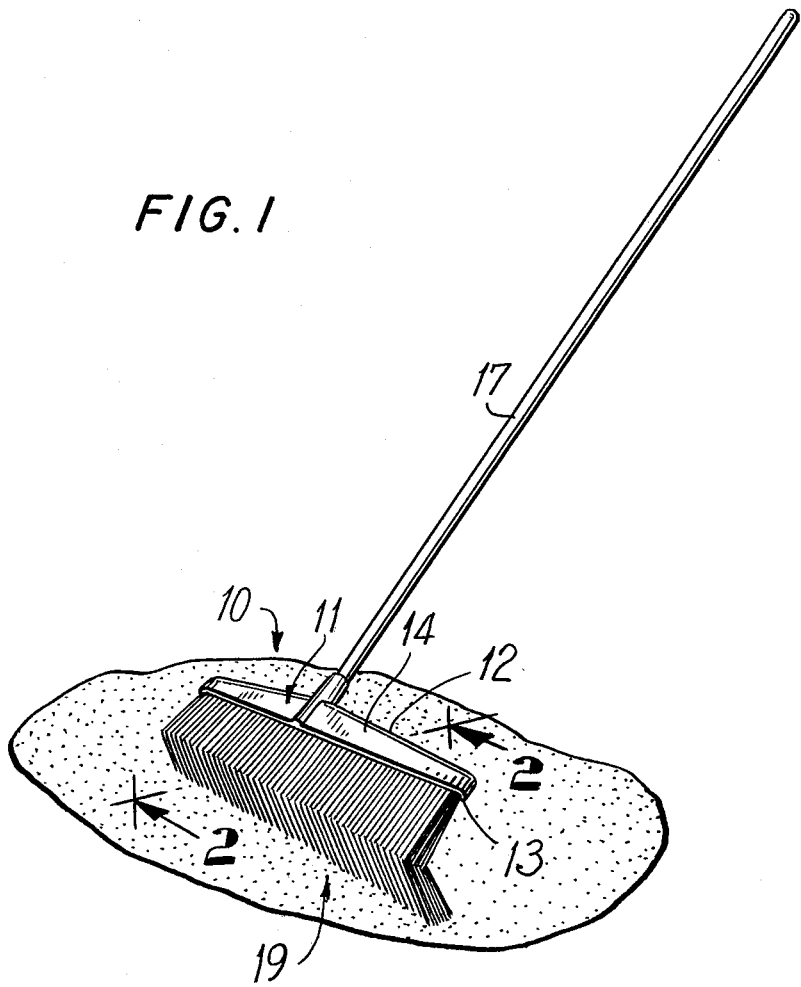
FIG. 1 is a perspective view of a broom rake of this invention showing it as it is being pushed by a user.
Figure 2:
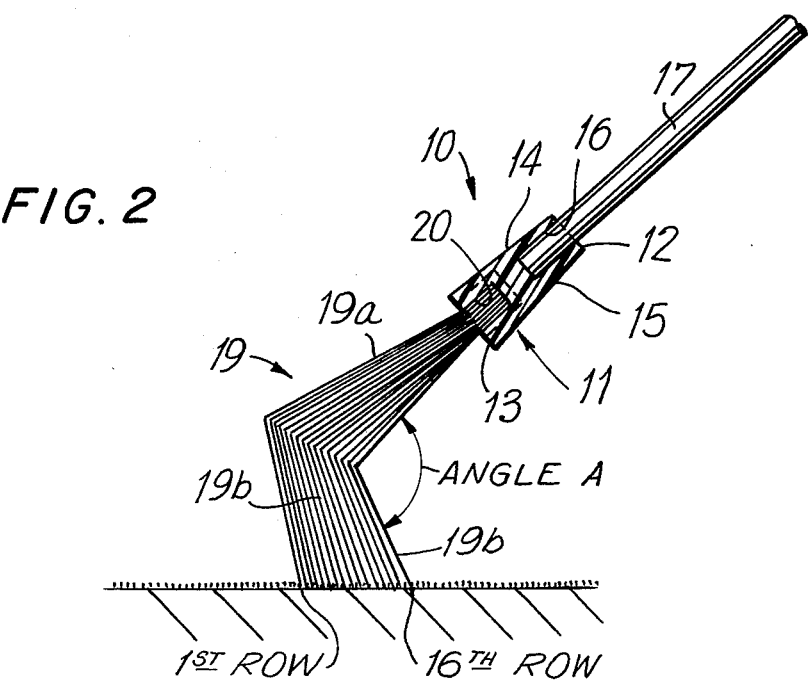
FIG. 2 is a side view of the broom rake of FIG. 1, partially in cross section along lines 2—2 of FIG. 1.

A broom rake 10 of this invention is shown in FIG. 1. This device includes a base 11, which is preferably made of plastic or a similar material. Base 11 has a first side 12, second side 13, top 14, and bottom 15 (shown in FIG. 2). Centrally formed in back 12 of base 11 is an opening 16, which is best shown in FIG. 2, into which a handle 17 is inserted. The handle is sufficiently long, so that a person of average height can operate the broom rake as described below while standing erect. Handle 17 may be friction fit into opening 16 of base 11 or may have a threaded end, so that its threaded end can be screwed into the base, when mating threads are provided on the inner surface of opening 16. The handle will preferably be made of plastic or wood, but may also be made of another rigid material commonly used for this purpose. Extending outwardly from second side 13 of base 11 are bristles, each of which are generally indicated at 19. One end of each of the bristles is captured within a longitudinal groove 20 in base 11 and the bristles are disposed across the longitudinal groove 20 in layers from the top to the bottom of the base. (The term layers as used herein can mean regular rows, clumps or any other irregular arrangement of the bristles and is intended to denote the fact that the broom rake of the present invention does not employ a single row of bristles but that a cross section taken at any point of the base would show a plurality of bristles.)

Bristles 19 are preferably made of a plastic material, such as styrene, but also may be made of one or more other resilient, flexible materials commonly used in brooms, such as the bristle materials disclosed in U.S. Pat. No. 3,616,480 (the disclosure of which is incorporated by reference herein). Particularly as shown in FIG. 2, each bristle 19 has a first portion 19a, one end of which is engaged in base 11, and a second portion 19b, which is bent at an angle to the first portion 19a.

With respect to the bend angle (angle A shown in FIG. 2) between portions 19a and 19b of each bristle 19, this angle will depend somewhat on the number and arrangement of bristles in the broom rake. As shown particularly in FIG. 2, bristles 19 are arranged in rows across base 11, one row on top of another row. Because the bristles flare outwardly from the point where one end of first portion 19a of each bristle is engaged in longitudinal groove 20 of base 11, the bend angle of each of the bristles in the top row (Row 1) is not the same as the bend angle of each of the bristles in the bottom row. (Row 16) Similarly, if the bristles were disposed in irregular bunches, the bend angle of each bristle would not be the same. For instance, in the broom rake of FIGS. 1 and 2, the bristles that are most bent would each have a bend angle between about 100° and about 110° and those that are least bent would each have a bend angle between about 140° and 150°, with the bristles bent the most being in the bottom row and the bristles bent the least being in the top row of the broom rake.

In FIGS. 1 and 2, the broom rake is shown in a condition where it is being pushed forward, i.e., the bristles are tensed in a direction towards handle 17. When the broom rake is pulled towards the user, bristles 19 tense in the opposite direction away from handle 17. To most efficiently accomplish both a pushing function of sweeping and a pulling function of raking, it is preferred that during use of the broom rake bristles 19 assume generally a perpendicular orientation to the surface being swept or raked. Of course, variation of the rows, bunches, or number of bristles in the broom rake affects the bend angle of the bristles. However, it is believed to be within the scope of one skilled in the art, in view of this disclosure to determine the bend angle of each bristle necessary for achieving the above stated dual functions, no matter the number or arrangement of bristles employed.

It is also been found that, depending upon the material of which a bristle is made and the flexibility of the bristle, the length of first portion 19a of each bristle should be between about 2 and 3 inches, while the length of second portion 19b of each bristle 19 should be between about 1 and 3 inches, to most effectively provide the broom rake with the capability of both being used for sweeping and raking.

What is claimed is:

1. A broom rake comprising:
   (a) a base having a top, a bottom opposed to the top, a first side, and a second side opposed to the first side;
   (b) a handle attached to and extending outwardly from the first side of the base;
   (c) a plurality of bristles anchored in and extending outwardly of the second side of the base, wherein said bristles are tightly disposed with respect to each other within the base and the bristles extend longitudinally along the second side thereof in layers from the top to the bottom of the base; each bristle having a first portion and a second portion, said first portion being anchored in the base and extending outwardly thereof to a substantial extent of the full length of the bristle, said second portion being disposed at an obtuse angle to the first portion and also having a substantial length relative to the full length of the bristle, wherein the obtuse angle varies from one layer to the next so that the bristles flare outwardly from the base.

2. The broom rake of claim 1 wherein the length of said first portion of each bristle is from 2/5 to 3/4 of the full length of the bristles.

3. The broom rake of claims 1 or 2 wherein said obtuse angle varies from about 100° to about 150°.

4. The broom rake of claim 3 wherein the layers of bristles are arranged in rows disposed from the top to the bottom of the base.

5. The broom rake of claim 4 having at least 10 rows of bristles wherein the bristles in the top row each have an obtuse angle of from about 140° to 150° and the bristles in the bottom row each have an obtuse angle of from about 100° to about 110°.

6. The broom rake of claim 3 wherein the layers of bristles are comprised of at least one bunch, wherein the bristles that are most bent each have an obtuse angle of between about 100° to about 110°, and wherein the bristles that are least bent each have an obtuse angle between about 140° and about 150°.

7. The broom rake of claim 5 wherein the length of the first portion of each of the bristles is between about 2 and 3 inches and the length of the second portion of each bristle is between about 1 and 3 inches.

* * * * *